US010339309B1

(12) United States Patent
Kling et al.

(10) Patent No.: US 10,339,309 B1
(45) Date of Patent: Jul. 2, 2019

(54) SYSTEM FOR IDENTIFYING ANOMALIES IN AN INFORMATION SYSTEM

(71) Applicant: Bank of America Corporation, Charlotte, NC (US)

(72) Inventors: John Howard Kling, Cincinnati, OH (US); Mark Earl Brubaker, Simi Valley, CA (US); Ronald James Kuhlmeier, Simi Valley, CA (US); Brian D. Diederich, Simi Valley, CA (US); Brandon Matthew Sloane, Santa Barbara, CA (US); Rachel Yun Kim Bierner, Los Angeles, CA (US); Cora Yan Quon, Los Angeles, CA (US)

(73) Assignee: Bank of America Corporation, Charlotte, NC (US)

( * ) Notice: Subject to any disclaimer, the term of this patent is extended or adjusted under 35 U.S.C. 154(b) by 215 days.

(21) Appl. No.: 15/618,893

(22) Filed: Jun. 9, 2017

(51) Int. Cl.
*G06F 21/00* (2013.01)
*G06F 21/55* (2013.01)
(Continued)

(52) U.S. Cl.
CPC .......... *G06F 21/554* (2013.01); *G06F 16/285* (2019.01); *G06F 16/9024* (2019.01); *G06F 2221/034* (2013.01)

(58) Field of Classification Search
CPC .. G06F 21/554; G06F 16/9024; G06F 16/285; G06F 2221/034
See application file for complete search history.

(56) References Cited

U.S. PATENT DOCUMENTS 5,345,595 A  9/1994 Johnson et al.
5,905,859 A  5/1999 Holloway et al.
(Continued)

OTHER PUBLICATIONS

The STRIDE Threat Model, retrieved from the internet on Sep. 6, 2016, https://msdn.microsoft.com/enus/library/ee823878(v=cs.20).aspx, 1 page.
(Continued)

*Primary Examiner* — Jason K Gee
*Assistant Examiner* — Ka Shan Choy
(74) *Attorney, Agent, or Firm* — Michael A. Springs; Moore & Van Allen PLLC; Peter B. Stewart

(57) ABSTRACT

A system for identifying anomalies in an information system is typically configured for: collecting information regarding a hierarchy of capabilities, a hierarchy of resources, capability instances, and resource instances of the information system; storing, in a graph database, nodes corresponding to the hierarchy of capabilities, hierarchy of resources, capability instances, and resource instances; collecting information regarding relationships among the hierarchy of capabilities, hierarchy of resources, capability instances, and resource instances; defining, in the graph database, edges corresponding to the relationships among the hierarchy of capabilities, hierarchy of resources, capability instances, and resource instances; collecting event and/or state data for the information system; comparing the event and/or state data to the graph database and determining that an event and/or state is anomalous; and, in response to determining that the event and/or state is anomalous, taking an information security action.

20 Claims, 7 Drawing Sheets

(51) Int. Cl.
*G06F 16/28* (2019.01)
*G06F 16/901* (2019.01)

(56) References Cited

U.S. PATENT DOCUMENTS

| | | | |
|---|---|---|---|
| 5,991,881 A | 11/1999 | Conklin et al. |
| 6,088,804 A | 7/2000 | Hill et al. |
| 6,119,236 A | 9/2000 | Shipley et al. |
| 6,279,113 B1 | 8/2001 | Vaidya |
| 6,298,445 B1 | 10/2001 | Shostack et al. |
| 6,301,668 B1 | 10/2001 | Gleichauf et al. |
| 6,347,374 B1 | 2/2002 | Drake et al. |
| 6,363,489 B1 | 3/2002 | Comay et al. |
| 6,381,242 B1 | 4/2002 | Maher, III et al. |
| 6,578,147 B1 | 6/2003 | Shanklin et al. |
| 6,631,416 B2 | 10/2003 | Bendinelli et al. |
| 6,704,874 B1 | 3/2004 | Porras |
| 6,735,701 B1 | 5/2004 | Jacobson |
| 6,772,345 B1 | 8/2004 | Shetty |
| 6,789,203 B1 | 9/2004 | Belissent |
| 6,839,850 B1 | 1/2005 | Campbell et al. |
| 6,910,135 B1 | 6/2005 | Grainger |
| 6,957,067 B1 | 10/2005 | Lyer et al. |
| 6,988,208 B2 | 1/2006 | Hrabik et al. |
| 7,181,766 B2 | 2/2007 | Bendinelli et al. |
| 7,225,188 B1 | 5/2007 | Gai et al. |
| 7,493,659 B1 | 2/2009 | Wu et al. |
| 7,506,155 B1 | 3/2009 | Stewart et al. |
| 8,015,091 B1 | 9/2011 | Ellis |
| 8,595,176 B2 | 11/2013 | Wang et al. |
| 8,914,406 B1 | 12/2014 | Haugsnes et al. |
| 9,438,618 B1 * | 9/2016 | Sultan | H04L 63/1433 |
| 9,509,712 B2 | 11/2016 | Pinney Wood et al. |
| 9,516,041 B2 | 12/2016 | Baikalov et al. |
| 9,516,054 B2 | 12/2016 | Malachi |
| 9,531,738 B2 | 12/2016 | Zoldi et al. |
| 9,537,879 B2 | 1/2017 | Blackwell |
| 9,560,066 B2 | 1/2017 | Visbal |
| 9,565,204 B2 | 2/2017 | Chesla |
| 9,571,512 B2 | 2/2017 | Ray et al. |
| 9,584,536 B2 | 2/2017 | Nantel |
| 9,596,256 B1 | 3/2017 | Thomson et al. |
| 2004/0006704 A1 | 1/2004 | Dahlstrom et al. |
| 2004/0221176 A1 | 11/2004 | Cole |
| 2005/0066195 A1 | 3/2005 | Jones |
| 2005/0193430 A1 | 9/2005 | Cohen et al. |
| 2007/0180107 A1 | 8/2007 | Newton et al. |
| 2007/0226796 A1 | 9/2007 | Gilbert et al. |
| 2009/0024627 A1 | 1/2009 | King |
| 2011/0138471 A1 | 6/2011 | Van de Weyer et al. |
| 2011/0161848 A1 | 6/2011 | Purcell et al. |
| 2011/0288692 A1 | 11/2011 | Scott |
| 2013/0307682 A1 | 11/2013 | Jerhotova et al. |
| 2014/0189098 A1 | 7/2014 | MaGill et al. |
| 2014/0237594 A1 | 8/2014 | Thakadu et al. |
| 2014/0245443 A1 * | 8/2014 | Chakraborty | H04L 63/1425 726/23 |
| 2014/0380484 A1 | 12/2014 | Choi et al. |
| 2015/0033337 A1 | 1/2015 | Baikalov et al. |
| 2015/0033341 A1 | 1/2015 | Schmidtler et al. |
| 2016/0182559 A1 | 6/2016 | Francy et al. |
| 2016/0359895 A1 | 12/2016 | Chiu et al. |
| 2017/0013011 A1 | 1/2017 | Renouil et al. |
| 2017/0063917 A1 | 3/2017 | Chesla |
| 2017/0085588 A1 | 3/2017 | Laidlaw et al. |
| 2018/0337935 A1 * | 11/2018 | Marwah | H04L 63/1425 |

OTHER PUBLICATIONS

Wikipedia, the Free Encyclopedia, retrieved from the internet on Sep. 6, 2016, https://en.wikipedia.org/wiki/Factor_analysis_of_information_risk, 4 pages.

* cited by examiner

SYSTEM FOR IDENTIFYING ANOMALIES IN AN INFORMATION SYSTEM

FIELD OF THE INVENTION

The present invention embraces a system for identifying anomalies in an information system. The system is typically configured for: collecting information regarding a hierarchy of capabilities, a hierarchy of resources, capability instances, and resource instances of the information system; storing, in a graph database, nodes corresponding to the hierarchy of capabilities, hierarchy of resources, capability instances, and resource instances; collecting information regarding relationships among the hierarchy of capabilities, hierarchy of resources, capability instances, and resource instances; defining, in the graph database, edges corresponding to the relationships among the hierarchy of capabilities, hierarchy of resources, capability instances, and resource instances; collecting event and/or state data for the information system; comparing the event and/or state data to the graph database and determining that an event and/or state is anomalous; and, in response to determining that the event and/or state is anomalous, taking an information security action.

BACKGROUND

As the use and importance of electronic information systems has increased, the security threats to such systems have also increased. Accordingly, a need exists for an improved way of countering such security threats.

SUMMARY

In one aspect, the present invention embraces a computerized system, and an associated method and computer program product, for identifying anomalies in an information system. The system typically includes a processor and a memory. The system also typically includes an information security analysis module stored in the memory and executable by the processor. In one embodiment, the information security analysis module is configured for: collecting information regarding a hierarchy of capabilities of the information system; storing, in a graph database, a plurality of capability nodes, each capability node corresponding to a capability category of the hierarchy of capabilities; collecting information regarding a hierarchy of resources of the information system; storing, in the graph database, a plurality of resource nodes, each resource node corresponding to a resource category of the hierarchy of resources; collecting information regarding a plurality of capability instances of the information system; storing, in the graph database, a plurality of capability instance nodes, each capability instance node corresponding to a capability instance of the plurality of capability instances of the information system; collecting information regarding a plurality of resource instances of the information system; storing, in the graph database, a plurality of resource instance nodes, each resource instance node corresponding to a resource instance of the plurality of resource instances of the information system; collecting information regarding relationships among the hierarchy of capabilities, the hierarchy of resources, the plurality of capability instances, and the plurality of resource instances; defining, in the graph database, edges among the plurality of capability nodes, the plurality of resource nodes, the plurality of capability instance nodes, and the plurality of resource instance nodes, the edges corresponding to the relationships among the hierarchy of capabilities, the hierarchy of resources, the plurality of capability instances, and the plurality of resource instances; collecting event and/or state data for the information system, wherein the event and/or state data includes parameters of an event and/or state; comparing the parameters of the event and/or state to the graph database; based on comparing the parameters of the event and/or state to the graph database, determining that the event and/or state is anomalous; and in response to determining that the event and/or state is anomalous, taking an information security action.

In a particular embodiment, the information security analysis module is configured for: collecting information regarding a current configuration of the information system; comparing the current configuration of the information system to the graph database; based on comparing the current configuration of the information system to the graph database, determining that an inconsistency exists between the current configuration of the information system and the graph database; and in response to determining that the inconsistency exists between the current configuration of the information system and the graph database, taking a second information security act.

In another particular embodiment, the information security analysis module is configured for: displaying, via a graphical user interface, a visual representation of at least a portion of the graph database.

In another particular embodiment, storing, in the graph database, the plurality of capability nodes comprises defining edges among the capability nodes that correspond to relationships among different capability categories of the hierarchy of capabilities.

In another particular embodiment, storing, in the graph database, the plurality of resource nodes comprises defining edges among the resource nodes that correspond to relationships among different resource categories of the hierarchy of resources.

In another particular embodiment, the plurality of capability instances comprise a plurality of abstract capability instances and a plurality of concrete capability instances.

In another particular embodiment, the plurality of capability instances comprise a plurality of abstract capability instances and a plurality of concrete capability instances.

In another particular embodiment, taking the information security action comprises: (i) disabling a resource instance of the information system, (ii) isolating a resource instance of the information system, (iii) blocking network traffic related to the event and/or state, (iv) quarantining or deleting a malicious file causing the event and/or state, or (v) increasing a level of authentication required to access a resource instance of the information system.

In another particular embodiment, taking the information security action comprises: (i) flagging the anomalous event and/or state for further investigation or analysis or (ii) transmitting an alert to a device of a user.

In another particular embodiment, (i) collecting the event and/or state data for the information system, (ii) comparing the parameters of the event and/or state to the graph database, (iii) determining that the event and/or state is anomalous, and (iv) in response to determining that the event and/or state is anomalous, taking the information security action are performed in real-time or near real-time.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
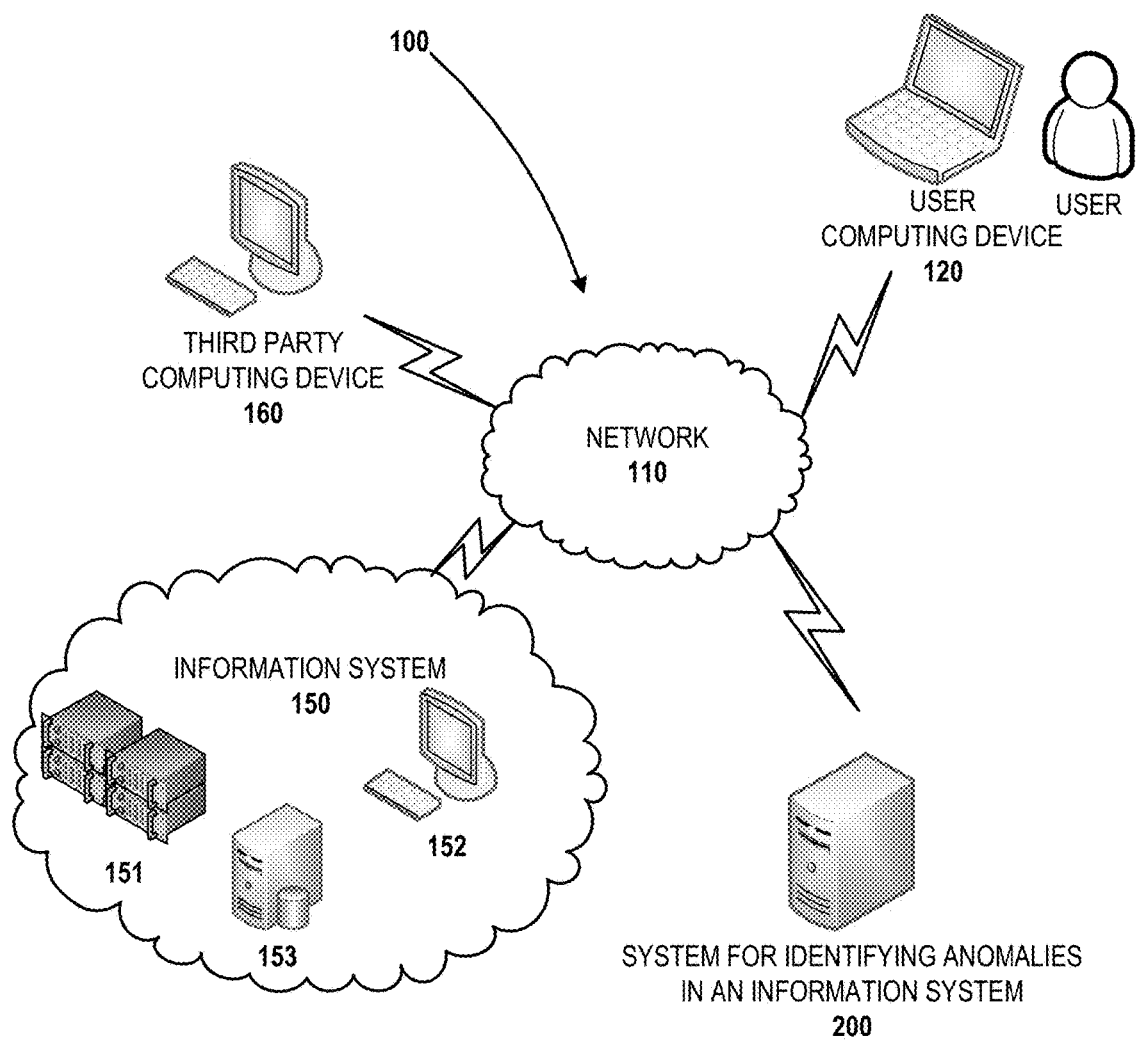
Figure 2:
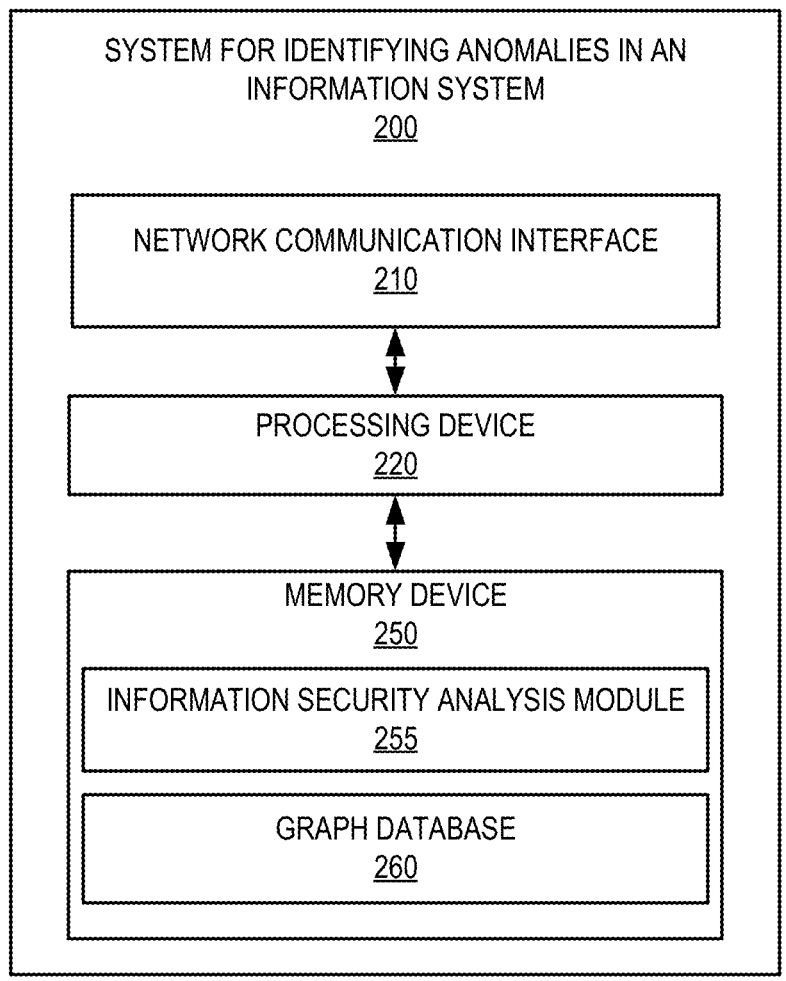
Figure 3A:
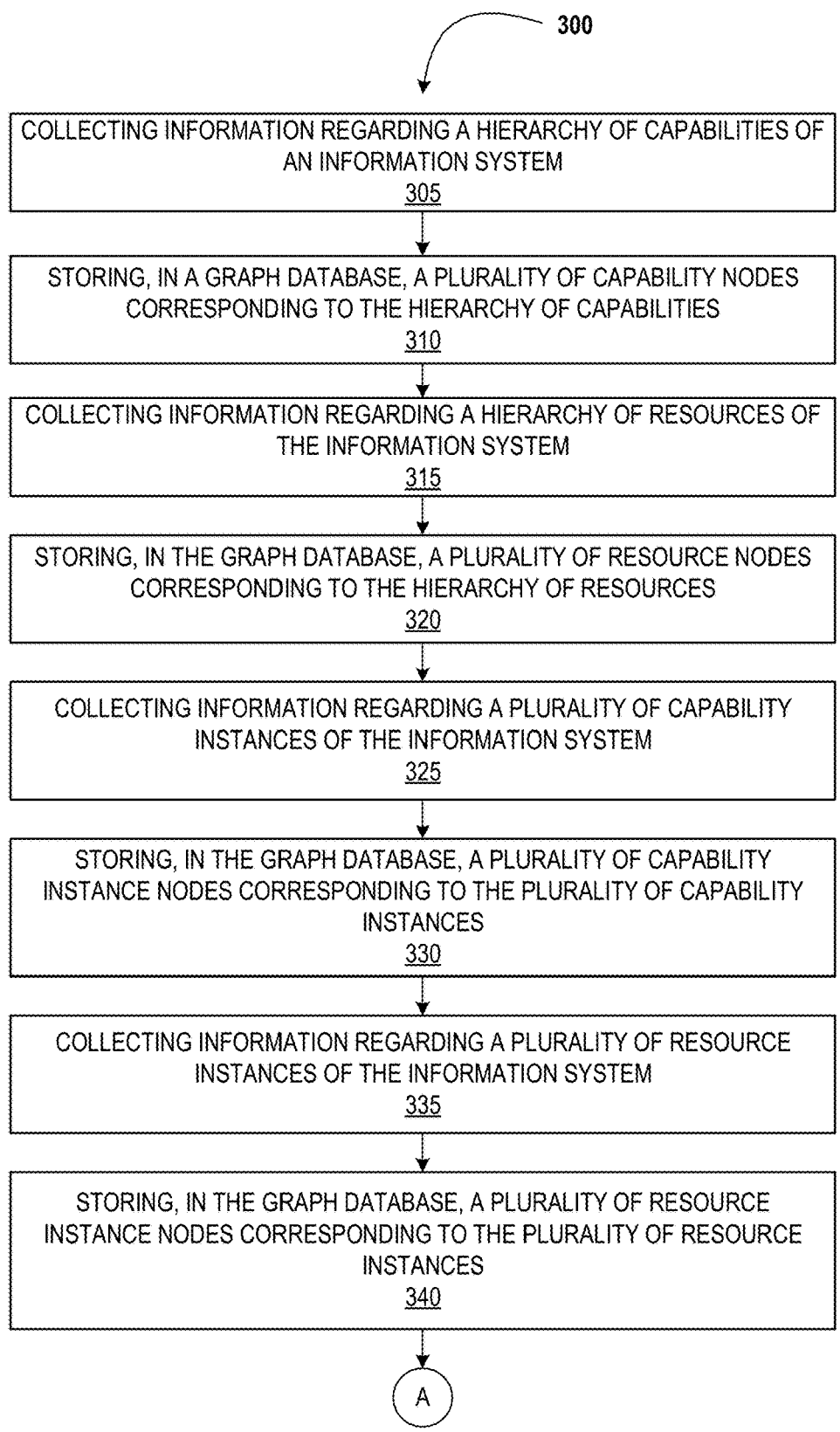
Figure 3B:
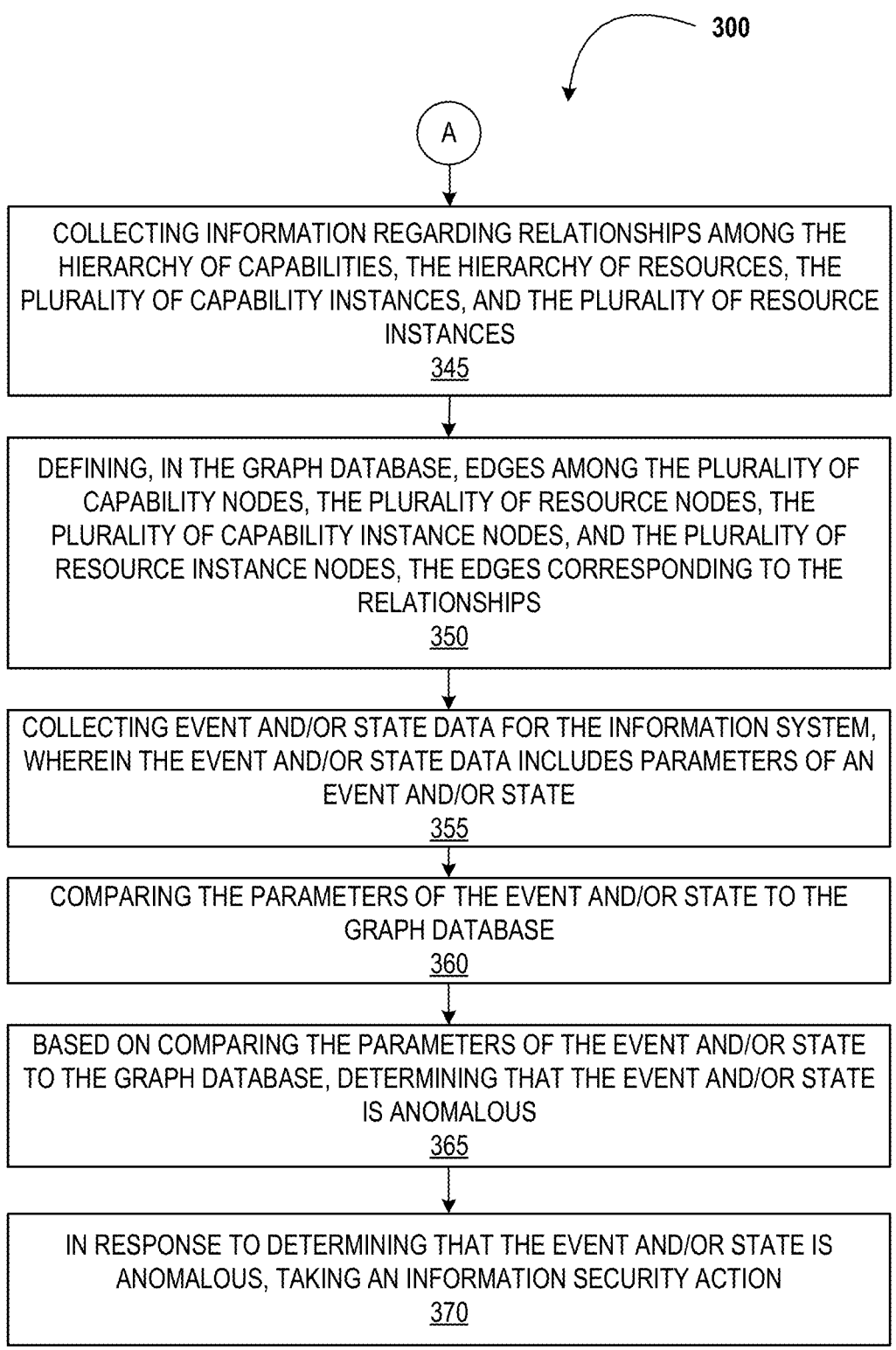
Figure 4A:
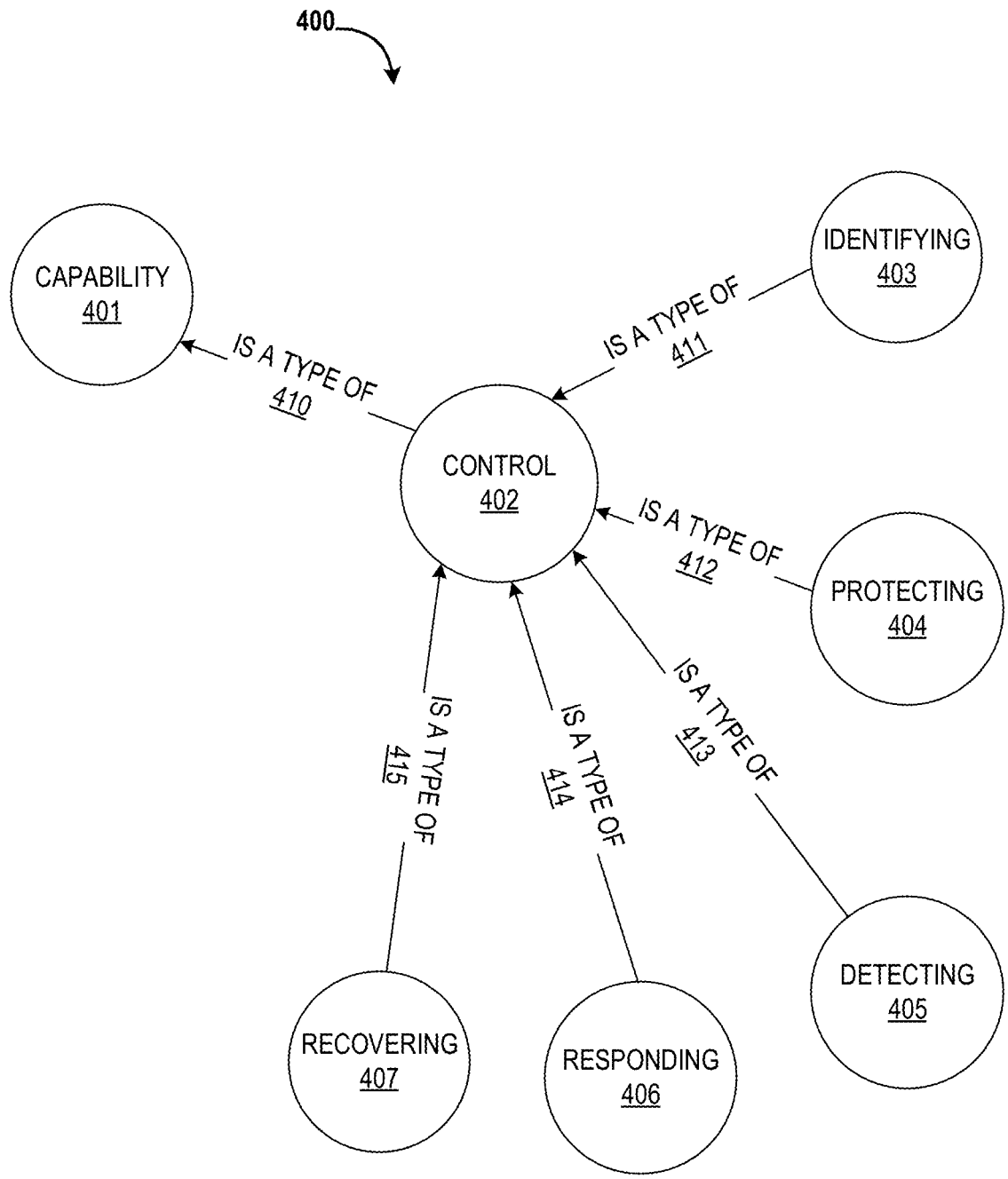
Figure 4B:
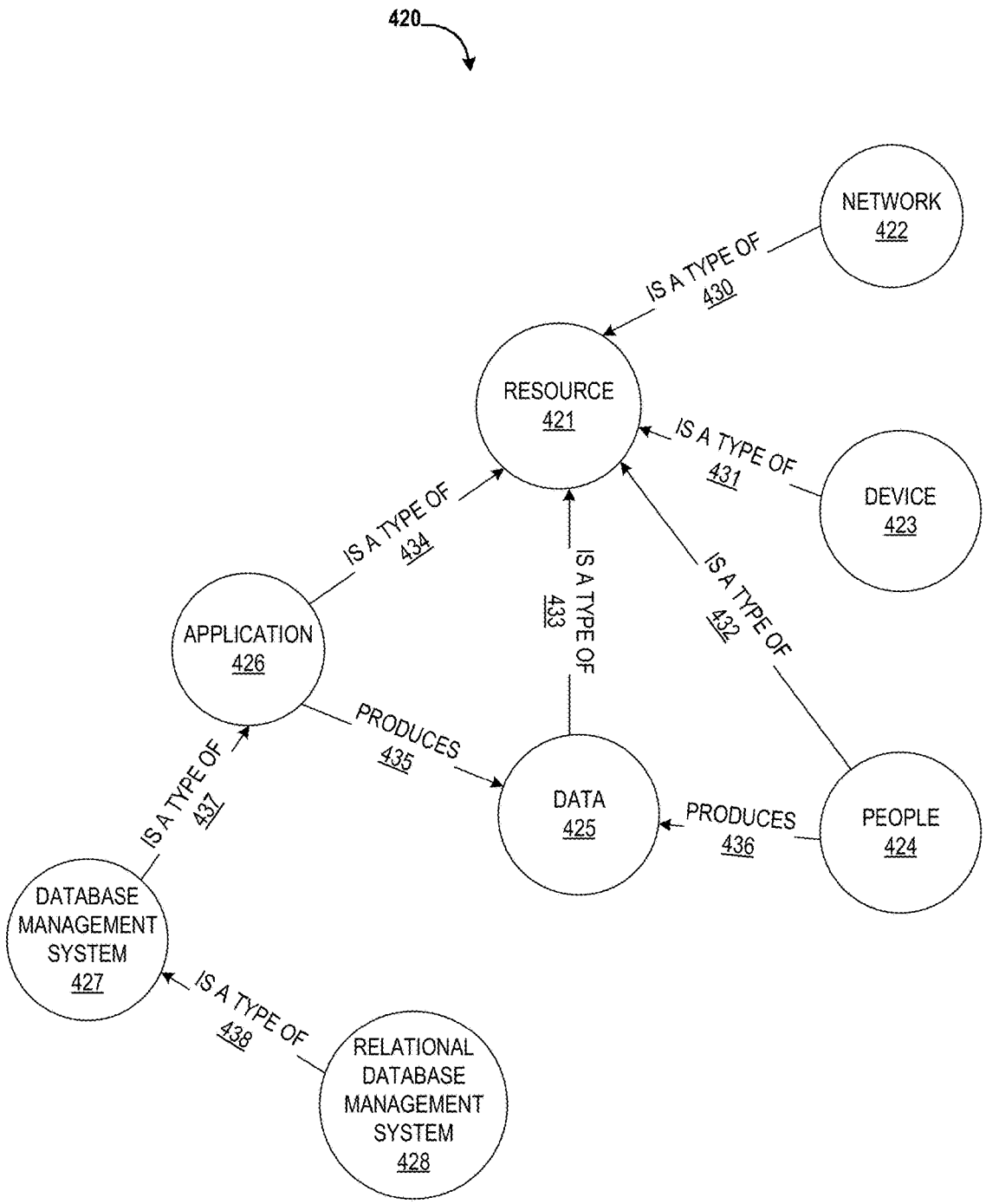
Figure 4C:
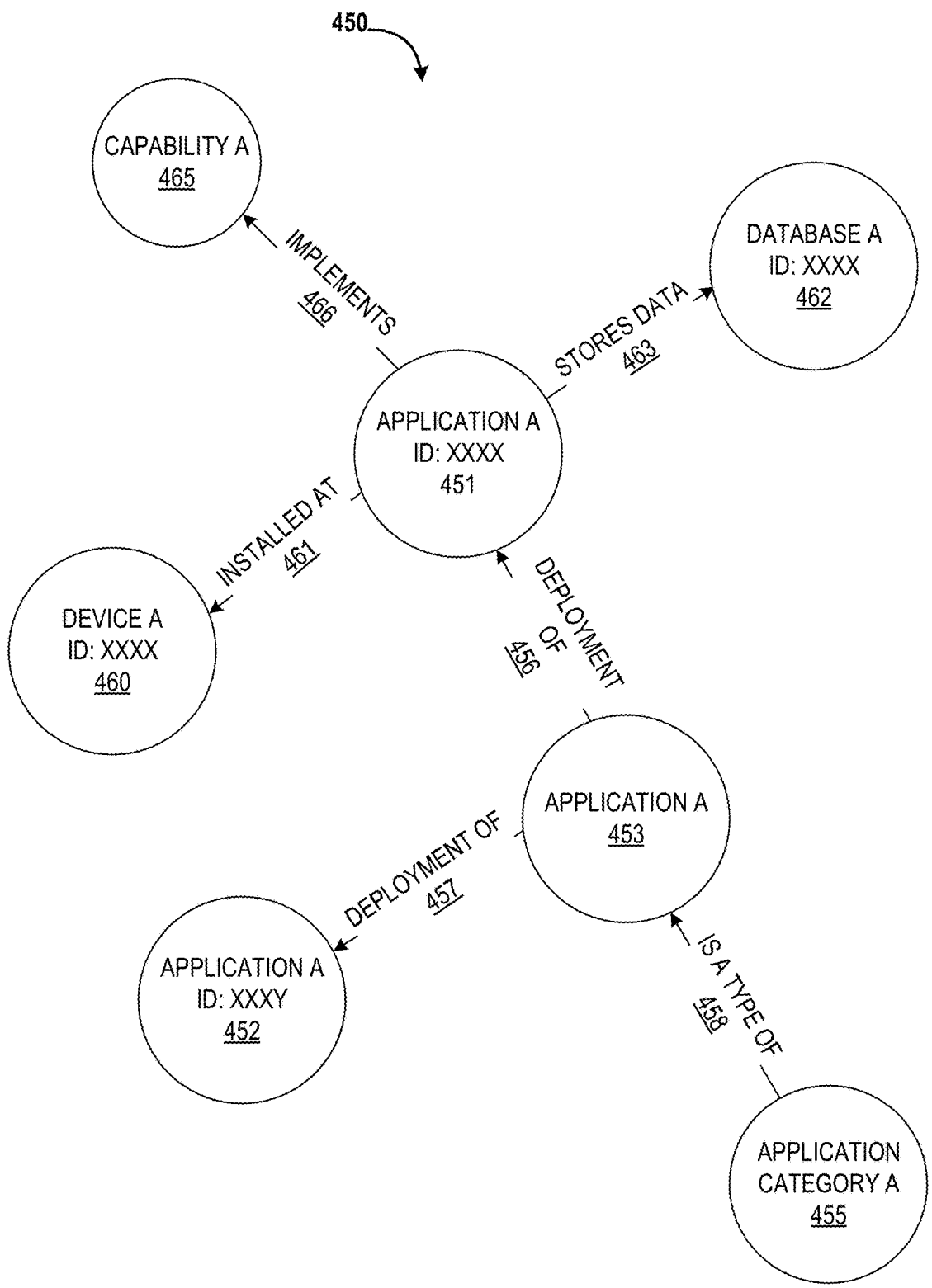

Having thus described embodiments of the invention in general terms, reference will now be made the accompanying drawings, wherein:

FIG. 1 depicts a system for identifying anomalies in an information system in accordance with an exemplary embodiment of the present invention;

FIG. 2 schematically depicts a system for identifying anomalies in an information system in accordance with an exemplary embodiment of the present invention;

FIGS. 3A-3B depict a method of identifying anomalies in an information system in accordance with an exemplary embodiment of the present invention;

FIG. 4A depicts a subset of capability nodes corresponding to an exemplary hierarchy of capabilities in accordance with an exemplary embodiment of the present invention;

FIG. 4B depicts a subset of resource nodes corresponding to an exemplary hierarchy of resources in accordance with an exemplary embodiment of the present invention; and FIG. 4C depicts an exemplary subset of nodes of a graph database after edges have been defined between the nodes in accordance with an exemplary embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

An "entity" may be any person or organization implementing a system for identifying anomalies in an information system described herein. A "user" may be any person or entity using a system for determining the effectiveness of information security technologies described herein. Often, a user is an employee of the entity.

A "capability" refers to an aptitude or competency that an entity may possess or require at an entity, business function, or individual level that has the potential, or is required to contribute to a business outcome thereby creating value. As used herein, a "capability" typically refers to a capability of an information system. A capability may be a business process, a control, or the like. A "hierarchy of capabilities" refers to both broad and specific categories of capabilities, as well as how such categories relate. By way of example, "controls" may constitute a broad category of capabilities, the category of "controls" may include the subcategories of "identifying," "protecting," "detecting," "responding," and "recovering," and "identifying known viruses" may be a particular category within the subcategories of "detecting."

A "control" is a particular type of capability that has a control objective. In this regard, a "control" typically refers to a particular type of function that a security technology may implement that safeguards aspects of an information system. Exemplary, categories of controls include identifying, protecting, detecting, responding, and recovering. "Identifying" relates to determining the exposure of the information system to security threats and may include: inventorying the resources within the information system, determining the exposure of portions of the information system to security threats, and creating a baseline of normal operation for the information system. "Protecting" relates to protecting the information system from security threats and may include: preventing unauthorized access to the system, managing access to the system, and containing and limiting the impact of attacks on the information system. "Detecting" relates to identifying attacks or other undesirable events and may include identifying unauthorized access and other anomalies in the information system. "Responding" relates to responding to an event and/or state and may include: eradicating an intrusion, assessing damage, and forensically reconstructing an attack. "Recovering" relates to recovering from an attack and may include returning to normal operations and restoring services.

A "resource" is a type of an asset that can be used by an entity (e.g., an enterprise) to further its objectives, usually by implementing a capability, such as within an information system. A "resource" may be broadly classified within one of several categories of resources. Broad resource classes within an information system typically include computing resources, data, and people. "Computing resources" are the hardware and software components that make up information systems. "Applications," "networks," and "devices" are types of computing resources. Computing resources have many capabilities. Not all capabilities however relate to computing resources. A "device" is typically any type of electronic device within an information system, such as workstations, personal computers, tablets, smartphones, servers, telephones, storage devices, network, devices, and the like. "Applications" typically refer to the software, interactions, and applications flows on the devices. "Networks" are typically the connections and traffics flowing among the devices and applications. "Data" is typically the information residing on, traveling through, and/or processed by the devices, applications, and/or networks. "People" typically are the users of the devices, applications, networks, and data. A "hierarchy of resources" refers to both broad and specific categories of resources, as well as how such categories relate. By way of example, "applications" may constitute a broad category of resources, the category of "applications" may include the subcategory of "database management systems," and the subcategory of "database management systems" may include the specific category of "relational database management systems."

An "abstract instance" refers to a particular capability or resource that may be deployed within an information system. In other words, an abstract instance is an exemplary capability or resource that relates to a particular category within a hierarchy of capabilities or hierarchy of resources. For example, if a hierarchy of resources includes the specific category of "relational database management systems,"

"DB2 database management system" may represents an abstract instance of a relational database management system.

A "concrete instance" relates to a "real-world" capability or resource that has been implemented within an information system. In other words, an "abstract instance" refers to a particular capability or resource that may theoretically be deployed within an information system, whereas a "concrete instance" refers to a particular, unique capability or resource that has actually been deployed in the information system. In this regard, an abstract capability instance is a particular capability of an abstract resource instance, and a concrete capability instance is a particular capability of a concrete resource instance. By way of example, if "DB2 database management system" is an abstract instance of a relational database management system, "DB2 database management system XXXX," which is a unique instance of a DB2 database management system that has a specific product number, release number and patch level and is running on a particular server to perform particular function(s), may be a "concrete instance." There may be multiple "concrete instances" of a particular "abstract instance." For example, if ten different devices corresponding to the same computer model are deployed within an information system, then the particular computer model would be considered to be an "abstract instance," and there would be ten "concrete instances," each concrete instance corresponding to a unique, deployed device corresponding to that computer model. A particular concrete resource instance may have different or additional capabilities as compared to its associated abstract resource instance. For example, a particular installation of a software application (a concrete resource instance) may be customized such that such installation of the software application has additional and/or different capabilities as compared to the standard version of the software application.

A "state" describes the condition of a computing resource during its life cycle. The "state" of a resource includes any of the attributes of the resource. Changes in state are the result of "events." An "event" is (i) something (e.g., an activity) that causes a change in the state of a computing resource (e.g., to an instance of a computing resource) or (ii) the reporting of a state or state change of a computing resource.

Information security relates to the preventing unauthorized access, use, disclosure, or manipulation of information stored in an information system, as well as protecting the integrity of the infrastructure (e.g., devices, networks, databases, software, and the like) of the information system. An important aspect of information security is identifying active threats/attacks on the information system. Anomalous events and/or states within the information system that may constitute (or result from) a threat or attack may be identified by creating a statistical model of the "normal" behavior/state of the information system and then using statistical analysis to identify material deviations from such normal behavior/state. One of the problems associated with identifying anomalies using such statistical analysis is that an attacker may be able to construct an attack to resemble "normal" behavior. For example, an attacker may configure the behavior of malware such that the behavior of such malware appears as noise within statistical models.

To address these problems, the present invention embraces a system that may be used to identify anomalies in an information system in a way that departs from such statistical analysis. In particular, the system typically collects information regarding the capabilities and resources of an information system. All of these capabilities and resources are then stored as nodes in a graph database. To represent the interrelationships between these capabilities and resources, the system defines edges between the nodes. Once constructed, the graph database represents the normal, expected behavior/state of the information system. Anomalies within the information system are then identified by comparing the parameters of events and/or states within the information system to the graph database. If the parameters of a particular event and/or state differs from the information system's normal, expected behavior/state as defined in the graph database, then the event and/or state is anomalous and further action may be taken to address any threat from the anomalous and/or state. By comparing event and/or state parameters to the defined graph database, instead of using statistical analysis to identify deviations from normal behavior/state, the system of the present invention is able to reduce the likelihood that an attacker will be able to mask an attack as normal behavior.

FIG. 1 depicts an operating environment 100 according to one embodiment of the present invention. As depicted in FIG. 1, the operating environment 100 typically includes an information system 150 owned and/or operated by an entity. The information system is typically a computer-based information system. Accordingly, the information system 150 typically includes a plurality of devices, such as a server 151 and a workstation 152, as well as other computer and technology based resources (e.g., devices, networks, and software applications). The devices within the information system 150 may be configured to operate one or more applications that process information. The devices within the information system 150 are typically configured to communicate with one another, other devices operated by the entity, and devices operated by third parties (e.g., customers), such as a third party computing device 160, via a network 110. The network 110 may be any type of network, such as the Internet, wide area network, local area network, Bluetooth® network, near field network, and/or any other form of contact or contactless network. Information received, processed, and/or created by the information system 150 may be stored in one or more databases 153. The information system 150 may include all devices, applications, and networks operated by the entity or may include a subset of such devices, applications, and networks.

The information system 150 typically includes a plurality of security technologies (e.g., applications, devices, and/or processes). Each security technology typically safeguards resources within one or more resources classes in the information system 150 by implementing one or more controls. For example, a first security technology may be configured to identify devices within the information system 150, a second security technology may be configured to detect unauthorized access of a network within the information system 150, and a third security technology may be configured to prevent unauthorized access to data stored within the information system 150.

The operating environment 100 also typically includes a system for identifying anomalies in the information system 200. The system 200 may be in communication with one or more users, each having a user computing device 120, such as a PC, laptop, mobile phone, tablet, television, mobile device, wearable device, or the like (e.g., via the network 110). In some embodiments, the system 200 and/or user computing devices 120 may be part of the information system 150.

FIG. 2 depicts the system for identifying anomalies in the information system 200 (also referred to as the "system 200") in more detail. As depicted in FIG. 2, the system 200 typically includes various features such as a network communication interface 210, a processing device 220, and a memory device 250. The network communication interface 210 includes a device that allows the system 200 to communicate with information system 150 and user computing devices 120 (e.g., over the network 110 (shown in FIG. 1)).

As used herein, a "processing device," such as the processing device 220, generally refers to a device or combination of devices having circuitry used for implementing the communication and/or logic functions of a particular system. For example, a processing device 220 may include a digital signal processor device, a microprocessor device, and various analog-to-digital converters, digital-to-analog converters, and other support circuits and/or combinations of the foregoing. Control and signal processing functions of the system are allocated between these processing devices (e.g., processors) according to their respective capabilities. The processing device 220 may further include functionality to operate one or more software programs based on computer-executable program code thereof, which may be stored in a memory. As the phrase is used herein, a processing device 220 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device," such as the memory device 250, generally refers to a device or combination of devices that store one or more forms of computer-readable media for storing data and/or computer-executable program code/instructions. Computer-readable media is defined in greater detail below. For example, in one embodiment, the memory device 250 includes any computer memory that provides an actual or virtual space to temporarily or permanently store data and/or commands provided to the processing device 220 when it carries out its functions described herein.

As noted, the system 200 is configured to identify anomalies in the information system 150. Accordingly, the system 200 typically includes one or more modules stored in the memory device 250, which facilitate the identification of such anomalies. As depicted in FIG. 2, the system 200 typically includes an information security analysis module 255 that is configured to identify anomalies in the information system 150. In addition, the system 200 typically includes a graph database 260. This graph database 260 typically defines the expected configuration and operation of the information system 150. As explained in more detail herein, the graph database 260 may be used by the system 200 to identify anomalies that depart from the expected configuration or operation of the graph database 260. In some embodiments, the graph database may be uploaded to the system 200. In other embodiments, the system 200 may be configured to create the graph database 260.

In this regard, FIG. 3 depicts a method 300 of identifying anomalies in an information system that may be performed by the information security analysis module 255.

Initially at block 305, the system 200 typically collects information regarding a hierarchy of capabilities of the information system 150. The hierarchy of capabilities typically represents different categories of capabilities that may be possessed by the information system 150. In order to precisely reflect the different capabilities that may be possessed by the information system 150, the hierarchy of capabilities typically includes numerous levels of categories and subcategories of capabilities. For example, the hierarchy of categories may include, among others, the broad category of "controls," which itself may include the subcategories of "identifying," "protecting," "detecting," "responding," and "recovering." Moreover, each of the subcategories of "identifying," "protecting," "detecting," "responding," and "recovering" may include multiple levels of subcategories.

Collecting the information regarding the hierarchy of capabilities of the information system 150 typically includes receiving such information (e.g., via a graphical user interface) from one or more users of the system 200, who may be knowledgeable individuals within the entity. In other words, users of the system 200 may create/define the hierarchy of capabilities of the information system 150 and then provide this information regarding the hierarchy of capabilities to the system 200.

At block 310, the system 200 typically stores in a graph database (e.g., the graph database 260) a plurality of capability nodes corresponding to the hierarchy of capabilities. A graph database is a particular type of database in which a graph structure is used to represent the relationships among different data items. In a graph database, a "node" represents a particular data item or record. A graph database further includes "edges" which define how different nodes relate to one another.

In order to represent the hierarchy of capabilities in the graph database, the system 200 typically defines a node for each category within the hierarchy of capabilities. Furthermore, the system 200 typically defines edges among the capability nodes (i.e., the nodes corresponding to the different capability categories within the hierarchy of capabilities) that corresponding to the relationships among the different categories of the hierarchy of capabilities. For example, the edges between the nodes may specify that a particular category is a subcategory of another category. By way of example, FIG. 4A depicts a subset 400 of capability nodes corresponding to an exemplary hierarchy of capabilities showing how the nodes 401-407 for "capability," "control," "identifying," "protecting," "detecting," "responding," and "recovering" interrelate via the edges 410-415.

Next, at block 315, the system 200 typically collects information regarding a hierarchy of resources of the information system 150. The hierarchy of resources typically represents different categories of resources that may be included within the information system 150. In order to precisely reflect the different capabilities that may be included within the information system 150, the hierarchy of resources typically includes numerous levels of categories and subcategories of resources. For example, the hierarchy of resources may include the broad categories of "devices," "applications," "networks," "data," and "people." Moreover, each of the categories of "devices," "applications," "networks," "data," and "people" may include multiple levels of subcategories. By way of example, the category of "applications" may include the subcategory of "database management systems," and the subcategory of "database management systems" may include the specific category of "relational database management systems."

Collecting the information regarding the hierarchy of resources of the information system 150 typically includes receiving such information (e.g., via a graphical user interface) from one or more users of the system 200, who may be knowledgeable individuals within the entity. In other words, users of the system 200 may create/define the hierarchy of resources of the information system 150 and then provide this information regarding the hierarchy of resources to the system 200.

At block 320, the system 200 typically stores in the graph database (e.g., the graph database 260) a plurality of resource nodes corresponding to the hierarchy of resources. In this regard, the system 200 typically defines a node for each category within the hierarchy of resources. Furthermore, the system 200 typically defines edges among the resource nodes (i.e., the nodes corresponding to the different resource categories within the hierarchy of resources) that corresponding to the relationships among the different categories of the hierarchy of resources. For example, the edges between the nodes may specify that a particular category is a subcategory of another category. By way of example, FIG. 4B depicts a subset 420 of resource nodes corresponding to an exemplary hierarchy of resources showing how the nodes 421-428 for "resource," "device," "application," "network," "data," "people," "database management system," and "relational database management system" interrelate via the edges 430-438.

At block 325, the system 200 collects information regarding a plurality of capability instances of the information system 150. The capability instances of the information system 150 are specific capabilities of the information system 150. The capability instances typically include both abstract instances and concrete instances of the capability instances. As noted an "abstract instance" refers to a particular capability that may theoretically be deployed within the information system 150, whereas a "concrete instance" refers to a particular, unique capability that has actually been deployed in the information system 150. In other words, an abstract capability instance is a particular capability of an abstract resource instance, and a concrete capability instance is a particular capability of a concrete resource instance.

Collecting the information regarding the plurality of capability instances of the information system 150 typically includes receiving such information from one or more users of the system 200. In this regard, the users of the system 200 may identify the capability instances of the information system 150 and then provide this information to the system 200 (e.g., via a graphical user interface).

At block 330, the system 200 typically stores in the graph database (e.g., the graph database 260) a plurality of capability instance nodes corresponding to the plurality of capability instances. In this regard, a node typically is created in the graph database for each identified capability instance, including identified abstract capability instances and concrete capability instances.

At block 335, the system 200 typically collects information regarding a plurality of resource instances of the information system 150. The resource instances of the information system 150 are specific resources of the information system 150. The resources instances typically include both abstract instances and concrete instances of the resources instances. As noted an "abstract instance" refers to a particular resource that may theoretically be deployed within the information system 150, whereas a "concrete instance" refers to a particular, unique resource that has actually been deployed in the information system 150. For example, a particular software application deployed within the information system 150 would constitute an abstract resource instance, whereas each unique installation of such software application would constitute a concrete instance of such software application. By way of further example, a particular computer model used within the information system 150 would constitute an abstract resource instance, whereas each unique, deployed device corresponding to such computer model would constitute a concrete resource instance of such computer model. Moreover, the particular capabilities of such particular computer model would constitute abstract capability instances, whereas the capabilities of each unique, deployed device corresponding to such computer model would constitute concrete capability instances.

Collecting the information regarding the plurality of resource instances of the information system 150 typically includes receiving such information from one or more users of the system 200. In this regard, the users of the system 200 may identify the resource instances of the information system 150 and then provide this information to the system 200 (e.g., via a graphical user interface).

At block 340, the system typically stores in the graph database (e.g., the graph database 260) a plurality of resource instance nodes corresponding to the plurality of resources instances. In this regard, a node typically is created in the graph database for each identified resource instance, including identified abstract resources instances and concrete resource instances.

At block 345, the system typically collects information regarding relationships among the hierarchy of capabilities, the hierarchy of resources, the plurality of capability instances, and the plurality of resource instances. These relationships typically indicate how the capability instances relate to the categories within the hierarchy of capabilities (e.g., indicating that a particular capability instance is a type of a particular category within the hierarchy of capabilities). Similarly, these relationships typically indicate how the resources instances relate to the categories within the hierarchy of resources (e.g., indicating that a particular resource instance is a type of a particular category within the hierarchy of resources). Moreover, these relationships typically indicate how the capability and resource instances relate to one another. For example, the relationships may indicate that a particular concrete instance is a unique deployment of a particular abstract instance. These relationships may also indicate which capability instances are implemented by a particular resource instance. Moreover, these relationship may indicate how the different resource instances interact. For example, a particular software application may be installed on a particular device and may store data in a particular database.

Collecting the information regarding these relationships typically includes receiving such information from one or more users of the system 200. In this regard, the users of the system 200 may identify the relationships among the hierarchy of capabilities, the hierarchy of resources, the plurality of capability instances, and the plurality of resource instances of the information system 150 and then provide this information to the system 200 (e.g., via a graphical user interface).

At block 350, the system typically defines in the graph database (e.g., the graph database 260) edges corresponding to the relationships among the hierarchy of capabilities, the hierarchy of resources, the plurality of capability instances, and the plurality of resource instances of the information system 150. In this regard, for each relationship, the system will typically define an edge between related nodes corresponding to such relationship. FIG. 4C depicts an exemplary subset 450 of nodes of a graph database after edges have been defined between the nodes. As shown in FIG. 4C, the subset 450 include the node 453 for the abstract resource instance "Application A." Application A is a type of a particular resource category of a hierarchy of resources, namely "Application Category A," which is represented at node 455. Accordingly, an edge 458 is defined to indicate how these nodes 453 and 455 relate. The information system includes two unique installations of Application A, and so the subset includes two concrete resource instance nodes, 451 and 452, that correspond to these unique installations. Two edges 456 and 457 are defined to indicate that the concrete resource instance nodes 451 and 452 are unique deployments of the abstract resource instance node 453. The subset 450 includes an edge 461 indicating that one of the unique installations of Application A (represented at node 451) is installed on a particular device, (represented at concrete resource instance node 460). The subset 450 further includes an edge 463 indicating that the same unique installation of Application A (represented at node 451) stores data is produces in a particular database, (represented at concrete resource instance node 462). The same unique installation of Application A (represented at node 451) also implements a particular capability instance, namely "Capability A" (represented at node 465), and so an edge 466 is defined to indicate that this installation of Application A (represented at node 451) implements Capability A (represented at capability instance node 465). The capabilities of this installation of Application A, including "Capability A" (represented at node 465), would constitute concrete capability instances, whereas the capabilities (not depicted) of Application A in general would constitute abstract capability instances. In one embodiment, this installation of Application A (node 451) may be customized to implement Capability A (node 465), whereas Application A, if not customized, might not implement Capability A, and so the abstract instance of Application A (node 453), as well as other concrete instances of Application A (e.g., the concrete instance represented by node 452), might not be linked in the graph database as implementing Capability A.

Once the edges corresponding to the relationships among the hierarchy of capabilities, the hierarchy of resources, the plurality of capability instances, and the plurality of resource instances of the information system 150 have been defined in the graph database, the graph database in effect defines the normal operations of the information system 150. Accordingly, the graph database can be used as a point of reference in identifying anomalous activity within the information system 150.

In this regard, at block 355, the system 200 collects event and/or state data for the information system 150. Different applications implemented in the information system 150 typically generate log files and other records regarding parameters of events and/or states that occur/exist in the information system 150. Accordingly, the system 200 may collect event and/or state data by automatically receiving or retrieving event log files and other event and/or state records from various applications of the information system 150. In some embodiments, a user of the system 200 may manually upload event log files and other event and/or state records to the system 200 (e.g., via a user interface). In some embodiments, the system 200 may include one or more monitoring applications that monitor events and/or states occurring/existing in the information system 150 and collect event and/or state data corresponding to such events and/or states. In some embodiments, the system 200 may collect event and/or state data for the information system 150 in real-time or near real-time (e.g., within second or minutes of an event and/or state occurring). In other embodiments, the system 200 may collect event and/or state data for the information system 150 periodically (e.g., hourly or daily).

Once the system 200 has collected event and/or state data, the system 200 typically analyzes such event and/or state data in order to identify any anomalous events and/or states. In this regard, at block 360, the system 200 compares parameters for a particular event and/or state contained in the event and/or state data to the graph database in order to determine whether such event and/or state is anomalous. In particular, the system 200 determines whether the parameters of such event and/or state are consistent with the normal operations of the information system 150 as defined in graph database. For example, such event and/or state may be considered anomalous if the event and/or state parameters indicate that (i) two resources instances interact in a way not defined in the graph database or (ii) a particular resource instance implements a capability instances in a way not defined in the graph database. The system 200 may automatically compare event and/or state data to the graph database in real-time or near real-time as such event and/or state data is collected by the system 200 for different events and/or states. In other embodiments, the system 200 may periodically analyze batches of event and/or state data in order to identify anomalous events and/or states. In further embodiments, the system 200 may analyze event and/or state data in order to identify anomalous events and/or states in response to receiving a user command (e.g., via a user interface).

Based on comparing the parameters of a particular event and/or state to the graph database, at block 365, the system 200 determines that such event and/or state is anomalous. For example, the system 200 may determine that a particular software application performed an event (e.g., accessing a particular database) and/or state not defined in the graph database as "normal" behavior for such software application. By way of further example, the system 200 may determine that a particular user of the information system 150 has accessed a particular device, application, or database for which such user is not authorized to access.

In response to determining that a particular event and/or state is anomalous, at block 370, the system 200 typically performs automatically one or more information security actions with respect to such event and/or state. An information security action may include flagging the event and/or state for further analysis or investigation, transmitting an alert to a particular user of the system 200 (e.g., an employee of the entity trained to respond to information security threats), disabling an affected application, device, or other resource instance (e.g., by transmitting a command to such device or application that causes such device or application to be disabled), isolating an affected resource instance from the remainder of the information system 150, blocking or otherwise regulating network traffic in the information system 150 related to the event (e.g., blocking an affected application from transmitting data outside the information system 150 or blocking an affecting application's access to a particular database) and/or state, quarantining or deleting malicious files that caused an anomalous event and/or state, increasing a level of authentication (e.g., requiring secondary authentication information, such as an answer to a challenge question, in addition to primary authentication information, such as a username and password) required for access to a particular resource instance, and/or the like.

In some embodiments, the system 200 may collect event and/or state data for the information system 150, automatically compare event and/or state data to the graph database, and, if an anomalous event and/or state is identified, automatically performing one or more information security actions in real-time or near real-time, thereby facilitating prompt identification and remediation of potentially harmful events and/or states. In other words, these steps may occur without any significant delay following the occurrence/initiation of the anomalous event and/or state (e.g., within a few seconds or minutes following the occurrence/initiation of the anomalous event and/or state).

In some embodiments, the graph database may be used to identify gaps in the controls that have been implemented to safeguard the information system 150. In one exemplary embodiment, the system 200 may be configured to display via a graphical user interface of the system 200 (e.g., in response to a user request) a graphical representation of the graph database (or portion(s) of the graph database) to a user of the system 200. The user may then be able to analyze the graph database in order to identify whether any gaps may exist in the controls that have been implanted. In another exemplary embodiment, the system 200 may be configured to collect information regarding the current configuration of the information system 150. Thereafter, the system 200 may compare the current configuration of the information system 150 with the graph database to determine whether the current configuration of the information system 150 is consistent with the graph database. If there is any inconsistency between the current configuration of the information system 150 and the graph database, then the system may automatically perform one or more information security actions (e.g., flagging the inconsistency for further review/analysis, transmitting an alert to a particular user (e.g., to a device of the user) of the system 200, disabling an affected resource, or isolating an affected resource from the remainder of the information system 150). For example, the graph database may indicate that a particular anti-virus application should be installed on every personal computer contained with the information system 150. However, based on comparing the current configuration of the information system 150 to the graph database, the system 200 may determine that such anti-virus program has not been installed on a particular personal computer deployed within the information system 150. Thereafter, the system 200 may (1) automatically transmit an alert to a defined user and (2) isolate the particular personal computer from the remainder of the information system 150 until such anti-virus application has been installed on the particular personal computer.

As evident from the preceding description, the system described herein represents an improvement in technology in that the system is able to identify anomalies in an information system and then take an information security action to address such anomalies. As noted, the system is able to identify anomalies by comparing event and/or state parameters to a graph database that has been created to represent normal operation of the information system. By comparing event and/or state parameters to the defined graph database, instead of using statistical analysis to identify deviations from normal behavior/state, the system of the present invention is able to reduce the likelihood that an attacker will be able to mask an attack as normal behavior. Accordingly, the system provides a technical solution for overcoming problems associated with identifying anomalous events and/or states by using statistical analysis to identify material deviations from normal behavior/state.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A computerized system for identifying anomalies in a computerized information system, comprising:
    a computer processor;
    a memory;
    a network communication device; and
    an information security analysis module stored in the memory, executable by the processor, and configured for:
        collecting information regarding a hierarchy of capabilities of the information system;
        storing, in a graph database, a plurality of capability nodes, each capability node corresponding to a capability category of the hierarchy of capabilities;
        collecting information regarding a hierarchy of resources of the information system;
        storing, in the graph database, a plurality of resource nodes, each resource node corresponding to a resource category of the hierarchy of resources;
        collecting information regarding a plurality of capability instances of the information system;
        storing, in the graph database, a plurality of capability instance nodes, each capability instance node corresponding to a capability instance of the plurality of capability instances of the information system;
        collecting information regarding a plurality of resource instances of the information system;
        storing, in the graph database, a plurality of resource instance nodes, each resource instance node corresponding to a resource instance of the plurality of resource instances of the information system;
        collecting information regarding relationships among the hierarchy of capabilities, the hierarchy of resources, the plurality of capability instances, and the plurality of resource instances;
        defining, in the graph database, edges among the plurality of capability nodes, the plurality of resource nodes, the plurality of capability instance nodes, and the plurality of resource instance nodes, the edges corresponding to the relationships among the hierarchy of capabilities, the hierarchy of resources, the plurality of capability instances, and the plurality of resource instances;
        collecting event and/or state data for the information system, wherein the event and/or state data includes parameters of an event and/or state;
        comparing the parameters of the event and/or state to the graph database;
        based on comparing the parameters of the event and/or state to the graph database, determining that the event and/or state is anomalous; and
        in response to determining that the event and/or state is anomalous, taking an information security action.

2. The computerized system according to claim 1, wherein the information security analysis module is configured for:
    collecting information regarding a current configuration of the information system;
    comparing the current configuration of the information system to the graph database;
    based on comparing the current configuration of the information system to the graph database, determining that an inconsistency exists between the current configuration of the information system and the graph database; and
    in response to determining that the inconsistency exists between the current configuration of the information system and the graph database, taking a second information security action.

3. The computerized system according to claim 1, wherein the information security analysis module is configured for: displaying, via a graphical user interface, a visual representation of at least a portion of the graph database.

4. The computerized system according to claim 1, wherein storing, in the graph database, the plurality of capability nodes comprises defining edges among the capability nodes that correspond to relationships among different capability categories of the hierarchy of capabilities.

5. The computerized system according to claim 1, wherein storing, in the graph database, the plurality of resource nodes comprises defining edges among the resource nodes that correspond to relationships among different resource categories of the hierarchy of resources.

6. The computerized system according to claim 1, wherein the plurality of capability instances comprise a plurality of abstract capability instances and a plurality of concrete capability instances.

7. The computerized system according to claim 1, wherein the plurality of resource instances comprise a plurality of abstract resource instances and a plurality of concrete resource instances.

8. The computerized system according to claim 1, wherein taking the information security action comprises: (i) disabling a resource instance of the information system, (ii) isolating a resource instance of the information system, (iii) blocking network traffic related to the event and/or state, (iv) quarantining or deleting a malicious file causing the event and/or state, or (v) increasing a level of authentication required to access a resource instance of the information system.

9. The computerized system according to claim 1, wherein taking the information security action comprises: (i) flagging the anomalous event and/or state for further investigation or analysis or (ii) transmitting an alert to a device of a user.

10. The computerized system according to claim 1, wherein (i) collecting the event and/or state data for the information system, (ii) comparing the parameters of the event and/or state to the graph database, (iii) determining that the event and/or state is anomalous, and (iv) in response to determining that the event and/or state is anomalous, taking the information security action are performed in real-time or near real-time.

11. A computer program product for identifying anomalies in a computerized information system comprising a non-transitory computer-readable storage medium having computer-executable instructions for:
collecting information regarding a hierarchy of capabilities of the information system;
storing, in a graph database, a plurality of capability nodes, each capability node corresponding to a capability category of the hierarchy of capabilities;
collecting information regarding a hierarchy of resources of the information system;
storing, in the graph database, a plurality of resource nodes, each resource node corresponding to a resource category of the hierarchy of resources;
collecting information regarding a plurality of capability instances of the information system;
storing, in the graph database, a plurality of capability instance nodes, each capability instance node corresponding to a capability instance of the plurality of capability instances of the information system;
collecting information regarding a plurality of resource instances of the information system;
storing, in the graph database, a plurality of resource instance nodes, each resource instance node corresponding to a resource instance of the plurality of resource instances of the information system;
collecting information regarding relationships among the hierarchy of capabilities, the hierarchy of resources, the plurality of capability instances, and the plurality of resource instances;
defining, in the graph database, edges among the plurality of capability nodes, the plurality of resource nodes, the plurality of capability instance nodes, and the plurality of resource instance nodes, the edges corresponding to the relationships among the hierarchy of capabilities, the hierarchy of resources, the plurality of capability instances, and the plurality of resource instances;
collecting event and/or state data for the information system, wherein the event and/or state data includes parameters of an event and/or state;
comparing the parameters of the event and/or state to the graph database;
based on comparing the parameters of the event and/or state to the graph database, determining that the event and/or state is anomalous; and
in response to determining that the event and/or state is anomalous, taking an information security action.

12. The computer program product according to claim 11, wherein the non-transitory computer-readable storage medium has computer-executable instructions for:
collecting information regarding a current configuration of the information system;
comparing the current configuration of the information system to the graph database;
based on comparing the current configuration of the information system to the graph database, determining that an inconsistency exists between the current configuration of the information system and the graph database; and
in response to determining that the inconsistency exists between the current configuration of the information system and the graph database, taking a second information security action.

13. The computer program product according to claim 11, wherein the non-transitory computer-readable storage medium has computer-executable instructions for: displaying, via a graphical user interface, a visual representation of at least a portion of the graph database.

14. The computer program product according to claim 11, wherein storing, in the graph database, the plurality of capability nodes comprises defining edges among the capability nodes that correspond to relationships among different capability categories of the hierarchy of capabilities.

15. The computer program product according to claim 11, wherein storing, in the graph database, the plurality of resource nodes comprises defining edges among the resource nodes that correspond to relationships among different resource categories of the hierarchy of resources.

16. The computer program product according to claim 11, wherein the plurality of capability instances comprise a plurality of abstract capability instances and a plurality of concrete capability instances.

17. The computer program product according to claim 11, wherein the plurality of resource instances comprise a plurality of abstract resource instances and a plurality of concrete resource instances.

18. The computer program product according to claim 11, wherein taking the information security action comprises: (i) disabling a resource instance of the information system, (ii) isolating a resource instance of the information system, (iii) blocking network traffic related to the event and/or state, (iv) quarantining or deleting a malicious file causing the event and/or state, or (v) increasing a level of authentication required to access a resource instance of the information system.

19. The computer program product according to claim 11, wherein taking the information security action comprises: (i) flagging the anomalous event and/or state for further investigation or analysis or (ii) transmitting an alert to a device of a user.

20. A method for identifying anomalies in a computerized information system, comprising:

collecting, via a computer processor, information regarding a hierarchy of capabilities of the information system;

storing, via a computer processor, in a graph database, a plurality of capability nodes, each capability node corresponding to a capability category of the hierarchy of capabilities;

collecting, via a computer processor, information regarding a hierarchy of resources of the information system;

storing, via a computer processor, in the graph database, a plurality of resource nodes, each resource node corresponding to a resource category of the hierarchy of resources;

collecting, via a computer processor, information regarding a plurality of capability instances of the information system;

storing, via a computer processor, in the graph database, a plurality of capability instance nodes, each capability instance node corresponding to a capability instance of the plurality of capability instances of the information system;

collecting, via a computer processor, information regarding a plurality of resource instances of the information system;

storing, via a computer processor, in the graph database, a plurality of resource instance nodes, each resource instance node corresponding to a resource instance of the plurality of resource instances of the information system;

collecting, via a computer processor, information regarding relationships among the hierarchy of capabilities, the hierarchy of resources, the plurality of capability instances, and the plurality of resource instances;

defining, via a computer processor, in the graph database, edges among the plurality of capability nodes, the plurality of resource nodes, the plurality of capability instance nodes, and the plurality of resource instance nodes, the edges corresponding to the relationships among the hierarchy of capabilities, the hierarchy of resources, the plurality of capability instances, and the plurality of resource instances;

collecting, via a computer processor, event and/or state data for the information system, wherein the event and/or state data includes parameters of an event and/or state;

comparing, via a computer processor, the parameters of the event and/or state to the graph database;

based on comparing the parameters of the event and/or state to the graph database, determining, via a computer processor, that the event and/or state is anomalous; and in response to determining that the event and/or state is anomalous, taking, via a computer processor, an information security action.

* * * * *